United States Patent [19]

Hojaji et al.

[11] 4,430,108

[45] Feb. 7, 1984

[54] METHOD FOR MAKING FOAM GLASS FROM DIATOMACEOUS EARTH AND FLY ASH

[75] Inventors: Hamid Hojaji, Kensington, Md.; Pedro B. de Macedo, 6100 Highboro Dr., Bethesda, Md. 20817; Theodore A. Litovitz, 3022 Friends Rd., Annapolis, Md. 21401

[73] Assignees: Pedro Buarque de Macedo, Bethesda; Theodore Aaron Litovitz, Annapolis, both of Md.

[21] Appl. No.: 418,078

[22] Filed: Sep. 14, 1982

Related U.S. Application Data

[63] Continuation-in-part of Ser. No. 311,317, Oct. 14, 1981, abandoned.

[51] Int. Cl.³ .......................................... C03B 19/08
[52] U.S. Cl. ................................... 65/22; 65/27; 428/312.6; 428/446; 428/703; 501/39
[58] Field of Search ............... 428/312.6, 312.8, 703, 428/446; 65/22, 27; 501/39

[56] References Cited

U.S. PATENT DOCUMENTS

| | | | |
|---|---|---|---|
| 1,945,052 | 1/1934 | Long . | |
| 2,215,039 | 9/1940 | Hood et al. . | |
| 2,233,608 | 3/1941 | Haux et al. ................ | 501/39 |
| 2,315,329 | 3/1943 | Hood et al. . | |
| 2,336,227 | 12/1943 | Dalton . | |
| 2,340,013 | 1/1944 | Nordberg et al. . | |
| 2,355,746 | 8/1944 | Nordberg et al. . | |
| 2,582,852 | 1/1952 | Shoemaker ................ | 501/39 |
| 2,978,340 | 4/1961 | Veatch . | |
| 3,133,820 | 5/1964 | Powell . | |
| 3,441,396 | 4/1969 | D'Eustachio et al. ........ | 65/22 |
| 3,454,453 | 7/1969 | Ward et al. ................... | 161/7 |
| 3,592,619 | 7/1971 | Elmer et al. .................. | 65/22 |
| 3,743,601 | 7/1973 | Rao ............................. | 252/62 |
| 3,744,984 | 7/1973 | Sato ............................. | 65/22 |
| 3,758,284 | 9/1973 | Haller ......................... | 65/31 |
| 3,874,861 | 4/1975 | Kurz ........................... | 65/22 |
| 3,945,816 | 3/1976 | Johnson ...................... | 65/22 |
| 3,951,632 | 4/1976 | Seki et al. ................... | 65/22 |
| 3,975,174 | 8/1976 | Camerlinck ................. | 65/22 |
| 4,038,063 | 7/1977 | Williams et al. ............ | 65/22 |
| 4,119,422 | 10/1978 | Rostoker ..................... | 65/22 |
| 4,178,163 | 12/1979 | Wilstefeld ................... | 65/22 |
| 4,192,664 | 3/1980 | Joshi ........................... | 65/22 |
| 4,220,461 | 9/1980 | Samanta ...................... | 65/22 |

FOREIGN PATENT DOCUMENTS

| | | | |
|---|---|---|---|
| 119795 | 4/1945 | Australia .................... | 65/22 |
| 447805 | 5/1936 | United Kingdom .......... | 65/22 |
| 636932 | 5/1950 | United Kingdom .......... | 65/22 |

OTHER PUBLICATIONS

Demidevich, "Manufacture and Uses of Foam Glass", National Technical Information Service, Publication No. AD/A-005 819.
Bulletin entitled "Celite Diatomite Filter Aids", Johns Manville Products Corp., Sep. 1979.

*Primary Examiner*—Robert L. Lindsay, Jr.
*Attorney, Agent, or Firm*—Fleit, Jacobson, Cohn & Price

[57] ABSTRACT

A method of making foam glass by impregnating diatomaceous earth, fly ash or mixtures thereof, and insoluble modifiers, if any, with at least one water soluble glass former in an amount expressed as its oxide of about 2.5 to 20 weight percent of the impregnated diatomaceous earth, fly ash or mixtures thereof; at least one water soluble flux in an amount expressed as its oxide of about 8 to 20 weight percent of the impregnated diatomaceous earth, fly ash or mixtures thereof; and at least one gas generator. The diatomaceous earth, fly ash or mixtures thereof is impregnated by mixing diatomaceous earth, fly ash or mixtures thereof and an impregnating solution comprising at least one water soluble glass former in an amount expressed as its oxide of about 3 to 14 weight percent; at least one water soluble flux in an amount expressed as its oxide of about 10 to 20 weight percent; at least one gas generator, and water in an amount of about 50 to 80 weight percent. Excess impregnating solution is removed and the impregnated diatomaceous earth, fly ash or mixtures thereof is heated to a sufficient temperature, generally about 720° to 1000° C., to cause foaming of the impregnated diatomaceous earth, fly ash or mixtures thereof. The foamed diatomaceous earth, fly ash or mixtures thereof is cooled and a foam glass body is thus formed.

54 Claims, 2 Drawing Figures

METHOD FOR MAKING FOAM GLASS FROM DIATOMACEOUS EARTH AND FLY ASH

CROSS REFERENCE TO RELATED APPLICATION

This application is a continuation-in-part of Ser. No. 311,317, filed Oct. 14, 1981, now abandoned.

BACKGROUND OF THE INVENTION

1. Field of the Invention

The invention relates to novel foam glass compositions and method for making the same based on diatomaceous earth, fly ash or mixtures thereof. As a result of the decreasing availability of energy sources, there has been a growing demand for heat insulating and acoustic materials capable of withstanding diverse conditions, and which have low thermal conductivity, high strength, chemical resistance, low water absorption, fire resistance, high temperature resistance, rot resistance, and termite resistance.

The well-known insulating materials such as glass fiber, polystyrene and polyurethane have found widespread acceptance, but lack structural strength, and are not resistant to high temperature conditions. In the case of polystyrene and polyurethane, toxic fumes are generated when they burn.

Foam glass can be substituted for asbestos, which has been virtually abandoned as an insulation material due to health hazards associated with its use. Foam glass can be made in various shapes and configurations for use in the construction industry, and can be utilized as a substitute for wooden boards, planks, sheets, shingles, and acoustic tiles.

2. Description of the Prior Art

Foam glass has long been known as a potential substitute for conventional insulation and acoustic materials for the building industry. Foam glass is essentially a glass or glass-like composition which has been rendered highly porous by the addition of gasifiers or foaming agents, which liberate gas or vapor when the glass is melted. The publication, Demidevich, *Manufacture and Uses of Foam Glass,* National Technical Information Service, Publication No. AD/A-05 819, discloses foam glass compositions and methods for making foam glass utilized throughout the world up through 1972. The most common technique for making foam glass on a commercial scale involves the melting of a window-type glass composition followed by fritting and grinding, in a continuous action ball mill while adding gasifiers. The ground glass containing gasifiers is placed in a heat-resistant mold lined with a refractory material to prevent sticking. Foaming is carried out in tunnel furnaces equipped with roller conveyors followed by annealing of the foamed blocks in a separate furnace for thirty (30) hours. This commercial process suffers from the drawback that the annealing process requires a large space and long annealing times, which is not economical.

Another method for making a foam glass is disclosed in U.S. Pat. No. 3,592,619 to Elmer et al, which is directed to making a high-silica glass foam from a borosilicate glass containing less than 70% by weight of silica. Elmer et al separate the glass into a silica-rich phase and a borate-rich phase, and thereafter leach the borate phase from the glass to produce a porous silica-rich body having a pore size in the range of about 10 to 25 angstroms. The leaching solution traps moisture in the fine pores of the leached glass, which expands the glass when heated to a temperature of 1300° to 1425° C. by flash-firing. The porous glass particles simultaneously sinter and foam. The foam glass composition made by the method of Elmer et al suffers from the disadvantage that high firing temperatures are required and flash-firing requires a refractory-lined furnace which consumes large amounts of energy. Additionally, residual moisture is left in the final foam glass product, which increases thermal conductivity.

U.S. Pat. No. 3,945,816 to Johnson produces a foam glass from borosilicate glass having a silica content of 40 to 90% by weight, a boric oxide content of about 10 to 50% by weight, and a metal oxide flux content from about 3 to 20% by weight. The process is conducted by forming a glass comprising the above constituents, melting the materials, fritting by rapid cooling, and crushing to fine particle size. The crushed glass is then mixed with a foaming agent disclosed as alkali and alkaline earth metal carbonates. The mixture is placed in a mold and fired for a period of one and one-half (1½) hours to a temperature of between 650° C. and 850° C. The foamed glass is then phase-separated into a silica-rich phase and a silica-poor phase without cooling, and the phase-separated foamed glass is subjected to a leaching to remove the silica-poor phase.

U.S. Pat. No. 4,192,664 to Joshi is directed to making a foam glass body from a high silica borosilicate glass composition by preparing a pulverulent homogenous mixture from constituents comprising amorphous silica of a micron size, alkali metal oxides, such as potassium hydroxide and potassium carbonate, a boric oxide introduced as boric acid, alumina, and a cellulating agent, such as carbon black and antimony trioxide. The foregoing components are formed into a slurry and subjected to a high shear mixing. The slurry is then subjected to drying in, for example, a spray drier to remove water from the slurry and form dry agglomerates which are then introduced into a crusher. The crushed agglomerates are then placed in a mold and sintered in a furnace at a temperature between 1200° and 1450° C.

U.S. Pat. No. 3,874,861 to Kurz is directed to a process for producing foamed glass from amorphous mineral particles, or mineral particles capable of being rendered amorphous by heating, and which have high silica content by mixing with gas forming agents and an alkali silicate. The foamable composition disclosed by Kurz can contain, in addition to mineral powders and alkali silicate, alkali carbonates, and gas forming agents soluble in sodium silicate (e.g., sugar). The materials are mixed, and then without drying, heated to between 750° and 950° C. to sinter the glass and simultaneously cause foaming by the evolution of water and liberation of $CO_2$ (from carbonates, if any). Kurz discloses the use of diatomaceous earth and fly ash as suitable mineral powders.

The Electric Power Research Institute (EPRI) has attempted to build power poles using fly ash. In a report prepared by ECP Inc., El Segundo, Ca., entitled "Development of Power Poles From Fly Ash, Phase 2", EL-1384, Research Project 851-1, Final Report, April 1980, foam glass compositions using fly ash are described. At page 5-2 parameters of the process used by the (EPRI) and some of the properties of the foam glass compositions are described. According to the (EPRI), the foam glass composition was heated to about 1050° C. above this temperature the composition foamed due to the carbonates present in the fly ash. Producing a viscous foam from fly ash and waste glass was not desirable for producing power poles.

Accordingly, it is an object of the invention to make a foam glass body from diatomaceous earth, fly ash or mixtures thereof which is inexpensive.

It is another object of the invention to make a foam glass body which is of high strength and of low thermal conductivity from diatomaceous earth, fly ash or mixtures thereof.

It is a further object of the invention to provide a method for producing foam glass from diatomaceous earth, fly ash or mixtures thereof which is adaptable for making foam glass of varying physical characteristics depending on the end use.

It is an additional object of the invention to produce a foam glass body having a water impermeable glaze for use as an exterior building material.

It is yet a further object of the invention to form a foam glass which has a fused outer protective layer.

Other objects will become apparent from the detailed description of the invention which follows.

SUMMARY OF THE INVENTION

In accordance with the present invention, a foam glass body is formed from diatomaceous earth, fly ash or mixtures thereof impregnated using an aqueous impregnating solution containing at least one water soluble glass former, at least one water soluble flux, at least one water soluble gas generator and water.

It is preferred to use calcined diatomaceous earth, and most preferred to use flux-calcined diatomaceous earth. It is preferred to use calcined fly ash which has been calcined in an oxidizing atmosphere. The calcination is conducted at a temperature of at least about 500° C.

The preferred water soluble glass formers are boron oxide containing compounds, preferably boric acid and alkali metal borates such as sodium borate and potassium borate, silicon oxide containing compounds, preferably alkali metal silicates such as sodium silicate and potassium silicate, phosphoric oxide containing compounds, preferably alkali metal phosphates such as sodium phosphate and potassium phosphate, and mixtures thereof.

The water soluble flux is preferably an alkali metal flux supplied by the alkali metal moiety of an alkali metal carbonate or bicarbonate, the alkali metal moiety of alkali metal borate or alkali metal silicate or alkali metal phosphate or mixtures thereof. The preferred alkali metals are sodium and potassium.

The gas generator may be the carbonate moiety of an alkali metal carbonate, or may be a carbohydrate which liberates carbon dioxide during thermal decomposition, such as sugar or glycerin. The diatomaceous earth utilized in the invention will generally have a median pore size of about 1.5 to 22 microns, and a surface area of about 1 to 40 m$^2$/g.

In compositions comprising diatomaceous earth, the mixing is preferably conducted by passing the impregnating solution through a bed of diatomaceous earth for sufficient time to impregnate the diatomaceous earth. Excess impregnating solution is removed from the bed of diatomaceous earth by applying a pressure differential across the bed to produce an impregnated diatomaceous earth having about 30 to 50 weight percent water. The impregnated diatomaceous earth is dried at a temperature sufficient to remove most residual moisture.

The dried impregnated diatomaceous earth is then pulverized to an average particle size less than about 1 millimeter, and the pulverized diatomaceous earth powders are placed in a mold and then heated to a temperature above the glass transition temperature of the impregnated diatomaceous earth, generally between about 720° and 900° C., for sufficient time to foam the impregnated diatomaceous earth. The foam glass is cooled below the glass transition temperature, which produces a foam glass having good mechanical strength, discrete pores of size less than about 10 millimeters, preferably less than about 3 millimeters in diameter and pores which are substantially sealed thereby preventing water absorption or thermal conduction between pores. In the case of a diatomaceous earth impregnated with a boron oxide containing compound, a fused protective water impermeable layer is formed on the outer sides of the foam body, made in accordance with the invention. Such foam glass compositions are particularly suitable as external weathering layers, such as roof shingles and exterior siding.

In compositions consisting essentially of fly ash, the mixing is preferably conducted by ball milling, or shear mixing, although any conventional mixing method may be used. The impregnated fly ash is dried at a temperature sufficient to remove most residual moisture. The dried fly ash is then pulverized to an average particle size of less than 1 millimeter, and the pulverized fly ash powders are placed in a mold and then heated to a temperature above the glass transition temperature of the impregnated fly ash, generally between about 875° C. and 1000° C., for sufficient time to foam the impregnated fly ash composition. The foam glass is then cooled below the glass transition temperature, which produces a foam glass having good mechanical strength, discrete pores of a size less than about 10 millimeters, preferably less than about 3 millimeters in diameter and pores which are substantially sealed thereby preventing water absorption or thermal conduction between pores.

The preferred process for making a foam glass body is to impregnate the diatomaceous earth, fly ash or mixture thereof with an impregnating solution which includes at least one water soluble glass foamer, at least one water soluble flux, at least one water soluble carbohydrate gas generator, and water. The impregnated composition is heated above its glass transition temperature. The composition is then cooled and pulverized. The pulverized impregnated composition is heated in an oxidizing atmosphere to a sufficient temperature to cause foaming and thereby form a foam glass body. When using this process, it is also possible to make a foam glass body from a composition comprising volcanic ash, preferably in combination with an insoluble additive such as silica sand.

DESCRIPTION OF THE PREFERRED EMBODIMENTS

Figure 2:
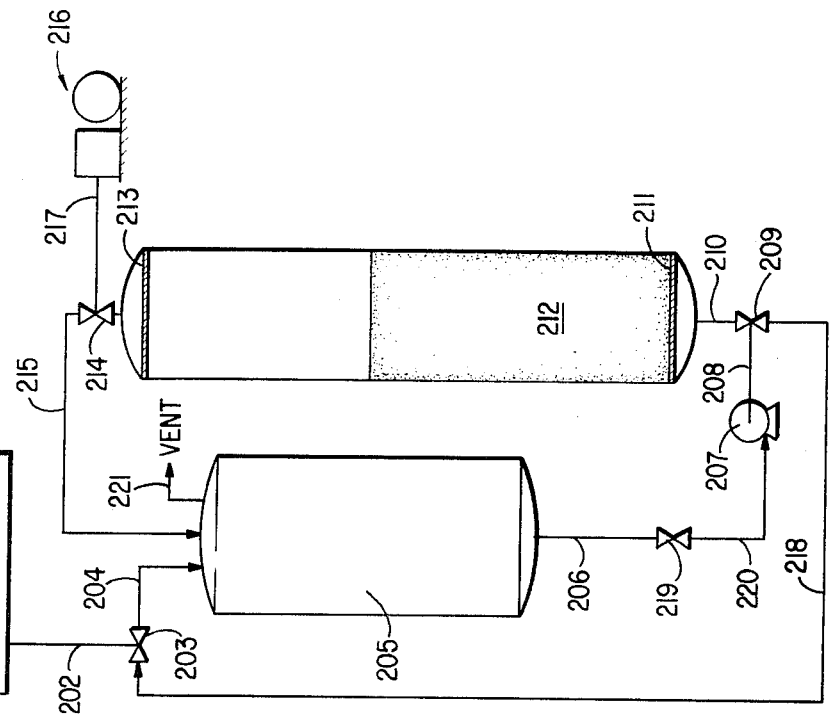
FIG. 2 illustrates a second preferred method of impregnating diatomaceous earth, fly ash or mixtures thereof.

The novel foam glass composition and method for making foam glass is based on the use of diatomaceous earth, fly ash, or mixtures thereof as the principal component of the foam glass.

Diatomaceous earth is a naturally occurring substance comprising the microscopic outer shell of a diatom and is porous with a median pore size of approximately 1.5 microns. The principal constituent of diatomaceous earth is silica ($SiO_2$) with minor amounts of other components, depending upon the source of the naturally occurring deposit. Typical chemical compositions of different deposits found in the United States are shown below in Table 1:

TABLE 1

| Constituent (wt %) | Lompol, Calif. | Basalt, Nev. | Sparks, Nev |
|---|---|---|---|
| $SiO_2$ | 88.90 | 83.13 | 87.81 |
| $Al_2O_3$ | 3.0 | 4.60 | 4.51 |
| CaO | .53 | 2.50 | 1.15 |
| MgO | .56 | .64 | .17 |
| $Fe_2O_3$ | 1.69 | 2.00 | 1.49 |
| $Na_2O$ | 1.44 | 1.60 | .77 |
| $V_2O_5$ | .11 | .05 | .77 |
| $TiO_2$ | .14 | .18 | .77 |
| Ignition Loss | 3.60 | 5.30 | 4.10 |

Three types of diatomaceous earth are commercially marketed as filter aids—natural grade diatomaceous earth, calcined diatomaceous earth, and flux-calcined diatomaceous earth. The natural grade diatomaceous earth is mined, crushed, dried and air-classified to provide a uniform particle size which is extremely fine with approximately 0.6% being retained on a 104 micron (150 mesh) sieve and has a median pore size of approximately 1.5 microns. The calcined grade of diatomaceous earth is similar to the natural grade, but is subjected to calcining at elevated temperatures, generally about 980° C., and usually has a median pore size of between 2.5 and 5 microns with between 1 to 5% being retained on the 104 micron (150 mesh) sieve. Flux-calcined diatomaceous earth is generally produced by the addition of a fluxing agent to a natural grade diatomaceous earth prior to calcination, which produces a diatomaceous earth having a median pore size of between 7 and 22 microns and has between 5.5 to 59% retained on the 104 micron (150 mesh) sieve. The fluxing agent can be soda ash, potash, or any known material which acts as a flux. Typical chemical analyses (in weight percent) of the three types of commercially-available diatomaceous earth are provided in Table 2 below.

TABLE 2

| Manufacturer | Grade | $SiO_2$ | $Al_2O_3$ | $Fe_2O_3$ | $P_2O_5$ | $TiO_2$ | CaO | MgO | $Na_2O$ + $K_2O$ | Ignition Loss |
|---|---|---|---|---|---|---|---|---|---|---|
| Johns-Manville | Natural | 85.8 | 3.8 | 1.2 | .2 | .2 | .5 | .6 | 1.1 | 3.6 |
| Johns-Manville | Calcined | 91.1 | 4.0 | 1.3 | .2 | .2 | .5 | .6 | 1.1 | .5 |
| Johns-Manville | Flux Calcined | 89.6 | 4.0 | 1.3 | .2 | .2 | .5 | .6 | 3.3 | .2 |
| Witco | Flux Calcined | 91–93 | 0.8–1.5 | 1.2–1.8 | 0.2–0.5 | — | .001–.008 | .2–.5 | 1.8–3.0 | 0.1–0.2 |

Minor amounts of water insoluble modifiers may be mixed with the diatomaceous earth. Examples of such modifiers are: volcanic ash, petalite, perlite, fly ash, wash ash, sand, silica dust, clays, refractory slags, gypsum, talc, glass powders, refractory fibrous materials, and other naturally occurring minerals and oxides. Other modifiers can be water insoluble compounds of Fe, Cu, Ni, Mg, Al, Ca, Ba, and Sr. Modifiers may be substituted for diatomaceous earth in amounts up to about 25 weight percent of the dry impregnated diatomaceous earth. In the case of volcanic ash and fly ash, amounts up to about 50 weight percent may be substituted. For purposes of the description contained herein, the term "diatomaceous earth" shall generically include modifiers substituted for a portion of the diatomaceous earth.

Fly ash is a waste product produced by coal burning power plants. Its utilization in foam glass making has both economic and environmental advantages. Typically, fly ash has a complex aluminosilicate composition which varies from site to site depending on the coal burned. The silica content of fly ash is generally between about 50 to 60 weight percent and the alumina content is from about 15 to 25 weight percent. The other major constituents are $Fe_2O_3$, $K_2O$ and CaO.

Fly ash by itself has high melting temperatures due to high alumina content. However, low melting glasses can be obtained by the addition of $SiO_2$, $B_2O_3$, alkali and alkaline earth oxides to fly ash.

Another inherent problem with the utilization of fly ash in glass melting is its high metallic iron content. This problem can be easily overcome by calcination of the fly ash at about 800° C. to 900° C. to oxidize metallic iron to iron oxide. It has been observed that foam glasses made with fly ash without prior calcination have non-uniform pore structure and a non-glassy appearance.

In order to reduce the amount of ash in a given coal, the coal may be washed prior to burning. The resulting waste product is called "wash ash". Upon calcining in an oxidizing atmosphere, the wash ash has similar properties to fly ash. "Fly ash" shall generically include calcined wash ash when used hereinafter.

Foam glasses have been produced with 100% calcined fly ash, impregnated with solutions containing sodium silicate, borax, alkali carbonates and sugar as the foaming agent. The resulting foam objects have excellent pore uniformity with a density of about 43 lb/ft$^3$ (688 kg/m$^3$). The high density is attributed to the high viscosity of glass at firing temperatures ranging from about 900° C. to 980° C. The high viscosity is associated with high alumina content of fly ash. To decrease the viscosity and yet maintain good chemical durability, the silica content of the foaming mixture can be increased by addition of silica. Any silica-bearing material, such as silica sand, waste glass, diatomaceous earth, etc., can be used for this purpose.

Silica sand and diatomaceous earth due to their low cost and high availability were selected over the other sources of silica. Addition of silica sand or diatomaceous earth to the fly ash can be done either during the calcination, prior to mixing with the impregnating solution or during the impregnation.

Water insoluble modifiers also may be mixed with fly ash. The modifiers are the same as those used in combination with diatomaceous earth. The modifiers may be substituted for fly ash in amounts up to about 50 weight percent of the dry impregnated fly ash. Thus, for the purposes of the description contained herewith, the term "fly ash" shall generically include modifiers substituted for a portion of the fly ash.

The diatomaceous earth, fly ash, or mixtures thereof and water insoluble modifiers, if any, is impregnated with at least one water soluble glass former, at least one water soluble flux, and at least one water soluble gas generator. When reference is made to a dry impregnated diatomaceous earth, fly ash, or mixtures thereof, about 2 to 5 weight percent water may be present. All calculations assume the presence of no water. The impregnated composition will contain, on the dry basis, about 55 to 85 weight percent, more preferably about 55 to 70 weight percent, most preferably about 60 to 65 weight percent, of the diatomaceous earth, fly ash, or mixtures thereof, and modifiers, if any, about 8 to 20 weight percent, preferably about 10 to 18 weight percent, of the water soluble flux expressed as its oxide, about 2.5 to 20 weight percent, preferably about 5 to 15 weight percent, of the water soluble glass former expressed as its oxide ($B_2O_3$, $SiO_2$, $P_2O_5$), and the gas generator.

The term "glass former" as used herein shall mean an oxide material which forms a glass or which contributes to the polymerization of a glass. The term "water soluble glass former" shall mean a compound having a moiety which is converted to a glass former upon heating above a predetermined temperature. The preferred water soluble glass formers are boron oxide containing compounds, silicon oxide containing compounds, phosphorus oxide containing compounds, or mixtures thereof.

The preferred boron oxide containing compounds are boric acid, and alkali metal borates, such as sodium borate (borax) and potassium borate. The boron oxide containing compound is impregnated in the diatomaceous earth, fly ash or mixture thereof in an amount expressed as anhydrous boron oxide ($B_2O_3$) of about 2.5 to 12 weight percent, preferably about 3.5 to 8 weight percent, of the dry impregnated diatomaceous earth, fly ash or mixture thereof.

The preferred silicon oxide containing compounds are alkali metal silicates, such as sodium silicate (waterglass) and potassium silicate. The silicon oxide containing compound is impregnated in the diatomaceous earth, fly ash or mixture thereof in an amount expressed as anhydrous silicon oxide ($SiO_2$) of about 2.5 to 12 weight percent, preferably about 3.5 to 8 weight percent, of the dry impregnated diatomaceous earth, fly ash or mixture thereof.

When a mixture of water soluble silicon oxide and boron oxide compounds are utilized to impregnate the diatomaceous earth, fly ash or mixture thereof, the boron oxide containing compound is impregnated in the diatomaceous earth, fly ash or mixture thereof in an amount expressed as anhydrous boron oxide of about 0.15 to 4.8 weight percent, preferably about 0.2 to 3.2 weight percent, of the dried impregnated diatomaceous earth, fly ash or mixture thereof, and the silicon oxide containing compound is impregnated in an amount expressed as anhydrous silicon oxide of about 1.5 to 11 weight percent, preferably about 2 to 7.5 weight percent, of the dried impregnated diatomaceous earth, fly ash or mixture thereof.

The preferred phosphorus oxide containing compounds are alkali metal phosphates such as sodium phosphate and potassium phosphate. It is preferred to use the phosphorus oxide containing compounds in admixture with water soluble silicon oxide compounds. The mixture of phosphorus oxide containing compounds and silicon oxide containing compounds is impregnated in the diatomaceous earth or fly ash or a mixture thereof in an amount expressed as anhydrous phosphorus oxide ($P_2O_5$) of about 0.15 to 4.8 weight percent, preferably about 0.2 to 3.2 weight percent, of the dried impregnated diatomaceous earth, fly ash or mixture thereof, and the silicon oxide containing compound is impregnated in an amount expressed as anhydrous silicon oxide of about 1.5 to 11 weight percent, preferably about 2 to 7.5 weight percent, of the dried impregnated diatomaceous earth, fly ash or mixture thereof.

The term "water soluble flux" as used herein shall mean a compound which promotes the fusion of diatomaceous earth, fly ash or mixture thereof, and lowers the melting point. The water soluble flux useful in practicing the invention may be supplied by the alkali metal moiety of water soluble alkali metal carbonates, such as sodium carbonate, potassium carbonate, sodium bicarbonate, and potassium bicarbonate, the alkali metal moiety of alkali metal borates, such as sodium borate and potassium borate, the alkali metal moiety of alkali metal silicates, such as sodium silicate and potassium silicate, and the alkali metal moiety of alkali metal phosphates, such as sodium phosphate and potassium phosphate. The water soluble flux is impregnated into the diatomaceous earth, fly ash or mixture thereof in amounts expressed as alkali metal oxide of about 8 to 20 weight percent, preferably about 10 to 18 weight percent, of the dry impregnated diatomaceous earth, fly ash or mixture thereof.

The term "gas generator" as used herein shall mean a compound which liberates a gas at the foaming temperature, typically about 720° to 1000° C. The gas generator useful in practicing the invention is preferably a carbon oxide gas generator which liberates carbon dioxide, carbon monoxide or mixtures thereof on heating. The carbon oxide gas generator is preferably the carbonate moiety of alkali metal carbonates and bicarbonates which will liberate its gas between about 720° and 900° C. When an alkali metal silicate supplies the water soluble glass former to impregnate the diatomaceous earth, fly ash or mixture thereof, alkali metal bicarbonates are not used as the carbon dioxide gas generator. The alkali metal carbonate performs the dual function of supplying the carbon oxide gas generator, as well as the water soluble flux, and will produce suitable foam glass without the addition of other gas generators such as carbohydrates. Carbohydrates, such as sugar and glycerin, may be used as the carbon dioxide gas generator in addition to or in place of alkali metal carbonates. Use of carbohydrates tends to lower the density of the foam glass product made with a silicon oxide containing compound or mixtures of silicon oxide containing compound and boron oxide containing compound. In the case where a double firing technique is used, as will be described hereinafter, the carbon oxide gas generator is preferably a carbohydrate.

The amount of gas generator impregnated in the diatomaceous earth, fly ash or mixture thereof should be sufficient to cellulate the impregnated diatomaceous earth, fly ash or mixture thereof upon heating, preferably in an amount expressed as carbon of about 1 to 3.5 weight percent, most preferably about 2 to 3 weight percent, of the dry impregnated diatomaceous earth, fly ash or mixture thereof.

The properties of the foam glass produced in accordance this invention depend upon impregnating constituents incorporated in the diatomaceous earth, fly ash or mixture thereof. For example, for single firing, diatomaceous earth, fly ash or mixtures thereof impregnated with a boron oxide containing compound, such as sodium borate, produce a foam having completely sealed pores, and the foam is relatively dense having a density of about 400 to 1100 kg/m$^3$, preferably about 480 to 560 kg/m$^3$. Diatomaceous earth, fly ash or mixtures thereof impregnated with a water soluble silicon oxide containing compound, such as sodium silicate, produce a foam with semi-closed pores and the foam is relatively light having a density of about 160 to 400 kg/m$^3$, preferably about 192 to 288 kg/m$^3$. Diatomaceous earth, fly ash or mixtures thereof impregnated with both a silicon oxide and a boron oxide or phosphorous oxide containing compound, produce a foam with completely closed pores having a variable density of about 160 to 1100 kg/m$^3$, depending on the relative ratio of silicon oxide containing compound to boron oxide or phosphorus oxide containing compound.

The diatomaceous earth, fly ash or mixture thereof is impregnated by mixing with an aqueous impregnating solution containing at least one water soluble glass former in an amount expressed as its oxide of about 3 to 14 weight percent, at least one water soluble flux in an amount expressed as its oxide of about 10 to 20 weight percent, preferably about 12 to 19 weight percent, at least one water soluble gas generator, and water in an amount of about 50 to 80 weight percent, preferably about 55 to 70 weight percent.

An impregnating solution based on a water soluble boron oxide containing compound will contain at least one water soluble boron oxide containing compound in an amount expressed as anhydrous boron oxide ($B_2O_3$) of about 3 to 14 weight percent, preferably between about 4 to 9 weight percent, of the solution, at least one alkali metal flux in an amount expressed as alkali metal oxide of about 10 to 20 weight percent, preferably about 12 to 16 weight percent, of the solution, at least one carbon oxide gas generator in an amount expressed as carbon of about 1.2 to 4.5 weight percent, preferably about 1.5 to 3.5 weight percent, of the solution, and water in an amount of about 50 to 80 weight percent, preferably about 55 to 70 weight percent, of the impregnating solution. The final foam glass product made from diatomaceous earth, fly ash or mixture thereof impregnated with a boron oxide containing compound such as boric acid, sodium or potassium borate, or mixtures thereof, will have a water impermeable glaze. Such product characteristics render the foam glass ideal for external building uses such as shingles and siding.

An impregnating solution based on a water soluble silicon oxide containing compound will contain at least one water soluble silicon oxide containing compound in an amount expressed as silicon oxide ($SiO_2$) of about 3 to 14 weight percent, preferably about 5 to 11 weight percent, of the impregnating solution, at least one alkali metal flux in an amount expressed as alkali oxide of about 10 to 20 weight percent, preferably about 12 to 19 weight percent, of the solution, at least one carbon oxide gas generator in an amount expressed as carbon of about 1.2 to 4.5 weight percent, preferably about 1.5 to 3.5 weight percent, of the solution and water, in an amount of about 50 to 80 weight percent, preferably about 55 to 70 weight percent, of the solution.

An impregnating solution based on a water soluble silicon oxide containing compound and a water soluble boron oxide containing compound will contain at least one water soluble silicon oxide containing compound and at least one boron oxide containing compound in an amount expressed as their oxide of about 3 to 20 weight percent, preferably about 5 to 14 weight percent, at least one alkali metal flux in an amount expressed as alkali oxide of about 10 to 20 weight percent, preferably about 12 to 19 weight percent, of the solution, at least one carbon oxide gas generator in an amount expressed as carbon of about 1.2 to 4.5 weight percent, preferably about 1.5 to 3.5 weight percent, of the solution, and water in an amount of about 50 to 80 weight percent, preferably about 55 to 70 weight percent, of the solution. The boron oxide containing compound is preferably in the solution in an amount of not less than about 0.5 weight percent, expressed in terms of boron oxide, and more preferably not less than about 1.0 weight percent.

An impregnating solution based on a water soluble silicon oxide containing compound and a water soluble phosphorus oxide containing compound will contain at least one water soluble silicon oxide containing compound and at least one phosphorus oxide containing compound in an amount expressed as their oxide of about 3 to 20 weight percent, preferably about 5 to 14 weight percent, at least one alkali metal flux in an amount expressed as alkali oxide of about 10 to 20 weight percent, preferably about 12 to 19 weight percent, of the solution, at least one carbon oxide gas generator in an amount expressed as carbon of about 1.2 to 4.5 weight percent, preferably about 1.5 to 3.5 weight percent, of the solution, and water in an amount of about 50 to 80 weight percent, preferably about 55 to 70 weight percent, of the solution. The phosphorus oxide containing compound is preferably in the solution in an amount of not less than about 0.5 weight percent, expressed in terms of phosphorus oxide, and more preferably not less than about 1.0 weight percent.

The impregnating solution is made by mixing the impregnating constituents with water at a temperature sufficient to dissolve all of the impregnating constituents, usually about 50° to 100° C., preferably about 60° to 80° C. It is important to maintain all the impregnating constituents in solution. Therefore, in the case of solutions based on a silicon oxide containing compound, the pH of the impregnating solution should be sufficiently high, pH 11 to 14, preferably pH 13, to prevent the precipitation of impregnating constituents from solution.

The impregnating solution and diatomaceous earth, fly ash or mixture thereof and water insoluble modifiers, if any, are mixed at sufficient temperature to maintain all impregnating constituents in solution, for example at about 50° to 100° C., preferably about 60° to 80° C., for a time sufficient to assure deposition of the impregnating agents into the pores of diatomaceous earth, fly ash or mixture thereof. Excess impregnating solution is removed, preferably in the case of a bed by the application of a pressure differential either by a vacuum or positive pressure across a retaining means, preferably a filter, to provide impregnated diatomaceous earth, fly ash or mixtures thereof containing between about 30 to 50 weight percent, preferably about 35 to 45 weight percent water. The resulting impregnated diatomaceous earth, fly ash or mixture thereof is dried at a sufficient temperature for sufficient time to reduce the water content to less than about 5 weight percent, preferably about 2 to 3 weight percent.

When producing foam glass from compositions comprising diatomaceous earth, the diatomaceous earth and impregnating solution must be mixed in a manner which assures complete penetration of the impregnating agents into the pores of the diatomaceous earth. Unexpectedly, it has been found that by mixing diamataceous earth and impregnating solution in accordance with the invention that impregnation is sufficiently complete to produce a foam glass body of superior characteristics compared to the prior art foam glass. In the preferred method of mixing, a bed of diatomaceous earth and water insoluble modifiers is formed in a vessel and an impregnating solution is passed through the bed at least once to assure complete impregnation of the diatomaceous earth.

When producing foam glass from compositions comprising fly ash, any conventional mixing method (e.g., ball milling, shear mixing) can be used, but shear mixing, due to its lower operation cost as compared to other methods, is preferred. In mixing, a water-based slurry is formed from fly ash, modifiers, if any, glass formers, fluxes, and gas generators. The amount of water in the slurry is determined such that a uniform consistency is obtained. A dilute slurry results in precipitation of denser materials in the shear mixer in addition to higher energy consumption for drying out the excess water introduced in the system.

Mixing is preferred at about 60° to 95° C., in order to minimize the water content required for good consistency. The preferred mixing time is between about 30 minutes to two hours depending on the performance of the shear mixer and volume of the mixture.

In fluidized bed mixing, the mixing may be batch or continuous. In a batch mixing, a bed of diatomaceous earth, or mixture thereof with fly ash, is formed in a vessel, and the impregnation solution is introduced into the vessel to substantially fill the vessel. Thereafter, a gas, such as air, is passed from below the bed up through the bed and impregnating solution, at sufficient gas velocity, about 10 to 150 l/min./m$^2$, preferably about 20 to 100 l/min./m$^2$, to fluidize the diatomaceous earth. After mixing, excess liquid is expelled from the vessel by the application of a pressure differential across the bed. The foregoing procedure can be repeated a plurality of times to assure adequate impregnation.

In the most preferred embodiment of batch mixing in a fluidized bed, the impregnating solution is maintained in a first vessel, and a bed of diatomaceous earth is deposited in a second vessel on a supportive retaining means, such as a screen or a filter. The impregnating solution is passed to the bottom of the second vessel containing the bed of diatomaceous earth and flowed upwardly to fill the vessel. After the impregnating solution is introduced into the second vessel containing diatomaceous earth, air or other suitable gas is passed through the mixture to fluidize the bed and ensure complete solid-liquid contact. Excess impregnating solution is removed from the bottom of the second vessel by reversing the flow either by the application of a vacuum to draw the liquid out, or by the application of a positive pressure above the bed to force the solution out of the vessel. An impregnated diatomaceous earth is formed on the supportive retaining means having a water content of about 30 to 50 weight percent, preferably about 35 to 45 weight percent.

The most preferred method of batch mixing is clearly illustrated by reference to FIG. 1. A predetermined amount of diatomaceous earth is deposited in vessel 102 as bed 104, which rests on filter 117. The premixed impregnating solution from a heated mixing tank (not shown in the figure) is fed through line 122 to vessel 101 in a predetermined amount. The impregnating solution 103 in vessel 101 (heated by a resistance coil, not shown) is introduced into vessel 102 (heated by a resistance coil, not shown) in measured amounts through control valve 105, conduit 121, open valve 120 and inlet line 123, by increasing the pressure in vessel 101 by action of air compressor 106 operated at between about 2 to 5 atm. Air compressor 106 pumps air through conduit 107, pressure gauge 108 and control valve 111. After vessel 101 is emptied, the air compressor 106 continues operation and passes air through vessel 102 to fluidize the bed of diatomaceous earth 104. Filter 117 acts as a gas distributor to distribute gas uniformly through the vessel 102. The air is passed through vessel 102 at sufficient gas flow rate, about 10 to 150 l/min./m$^2$, preferably about 20 to 100 l/min./m$^2$, to fluidize the diatomaceous earth. Fluidization continues for sufficient time to ensure complete liquid/solid contact, usually between about 1 and 30 minutes, preferably about 20 minutes. After mixing is completed, the impregnating solution is removed from vessel 102 by reducing the pressure to less than about 0.5 atm in vessel 101 by vacuum pump 115 and impregnating solution is drawn from vessel 102 through line 123 and is reintroduced into vessel 101 via conduit 121. The foregoing steps may be repeated at least once. An impregnated diatomaceous earth is formed on filter 117, which can be discharged by dismantling the bottom of the vessel 102, or through discharge line 118.

In the continuous mixing method, impregnating solution is continuously passed through the bed of diatomaceous earth from below the bed, while being continuously removed from above the bed. The entering impregnating solution should have a flow rate sufficient to fluidize the bed of diatomaceous earth, about 20 to 200 l/min./m$^2$, preferably about 40 to 80 l/min./m$^2$ (liters of impregnating solution per minute per cross-sectional area of mixing vessel). The impregnating solution can be continuously recycled from above the bed to below the bed of diatomaceous earth.

The preferred embodiment of continuous mixing is illustrated in FIG. 2. The constituents of the impregnating solution are mixed in a heated-stirred tank 201. The impregnating solution then is withdrawn from tank 201, and passed through conduit 202, valve 203, conduit 204, into heated solution reservoir 205. The impregnating solution is then pumped from vessel 205, through conduit 206, control valve 219, conduit 220, pump 207, conduit 208, valve 209, and conduit 210, into heated vessel 212, in which a bed of diatomaceous earth has been deposited, on filter substrate 211. The impregnating solution continuously flows in an upward direction in vessel 212, at a flow rate sufficient to fluidize the bed of diatomaceous earth to provide complete solid-liquid contact. The flow-rate is controlled by means of the pumping speed of pump 207. The flow rate is about 20 to 200 l/min./m$^2$, preferably about 40 to 80 l/min/m$^2$. Filter substrate 211 acts as a liquid distributing means to provide a substantially uniform fluid flow of impregnating solution along the cross-section of the vessel 212 through the bed. Impregnating solution is continuously removed from vessel 212 via conduit 214, and is continuously recycled to vessel 205 via conduit 215. Filter substrate 213 retains the bed in vessel 212. The solution recirculation is continued for sufficient time, preferably about 5 to 15 minutes, depending on the type and amount of the diatomaceous earth present in vessel 212 to impregnate the bed. Pumping is then terminated and excess impregnating solution in vessel 212 is forced out of vessel 212 through filter substrate 211, conduit 210, control valve 209, conduit 218, control valve 203, conduit 204, back into vessel 205 by the application of a positive pressure differential greater than 2 atm, produced by the compressor 216. The impregnating solution may be forced out of vessel 212 by the application of a vacuum of less than about 0.5 atm by a vacuum pump not shown in FIG. 2. The impregnated diatomaceous earth having a moisture content of about 30 to 50 weight percent, preferably about 35 to 45 weight percent, is removed from vessel 212 by removing the filter membrane 211 and the bottom of vessel 212.

In both batch mixing and continuous mixing, it is preferable to introduce the impregnating solution into the vessel from the bottom of the bed. It is postulated that by introducing impregnating solution into the bottom of the bed and slowly filling up the vessel, air trapped in the pores of the diatomaceous earth or mixture thereof with fly ash is more readily expelled, thereby permitting impregnating solution to readily enter the pores.

It has been found that in using diatomaceous earth compositions, alternative methods of mixing diatomaceous earth and impregnating solution are less efficient in providing proper penetration of the impregnating solution into the diatomaceous earth pores. For example, shear mixing conducted in a high shear mixer produces a denser body with less porosity on foaming. While applicants do not wish to be bound by such explanation, it is believed that, in shear mixing, the impregnating solution does not penetrate the pores of the diatomaceous earth, but merely forms a surface coating on the diatomaceous earth particles. Therefore, upon foaming at high temperatures, a liquid boron-alkali oxides rich phase is formed (in the case of a boron oxide glass former) between the silica-rich phase of the diatomaceous earth. On thermal decomposition foaming gases escape from the low viscosity liquid phase. This leaves a silica-solid phase substantially intact. Likewise, dry ball milling, wet ball milling and stirred tank mixing do not produce sufficient penetration of impregnating constituents to produce a high quality foam glass body.

The problems inherent in mixing the impregnating solution and diatomaceous earth by means other than the preferred mixing methods of the invention can be overcome, in some instances, particularly in the case of shear mixing, by increasing the amount of water in the impregnating solution. This increases the mobility of the impregnating components sufficiently to permit penetration in the diatomaceous earth pore structure. Under such conditions, the amount of water present in the slurry generally varies between about 60 to 80 weight percent of the total weight depending on the percentage of diatomaceous earth in the powder mixture.

On the other hand, when compositions are used consisting essentially of fly ash, it is preferred that the shear mixing method be used. The reason shear mixing works better is not known, however it may be theorized that fly ash does not contain pores of the size that are available in the diatomaceous earth for impregnation, and that the impregnating solution preferably forms a surface coating on the fly ash particles. Therefore, it is preferred that the fly ash be foamed using the double firing technique as is described below.

Figure 1:
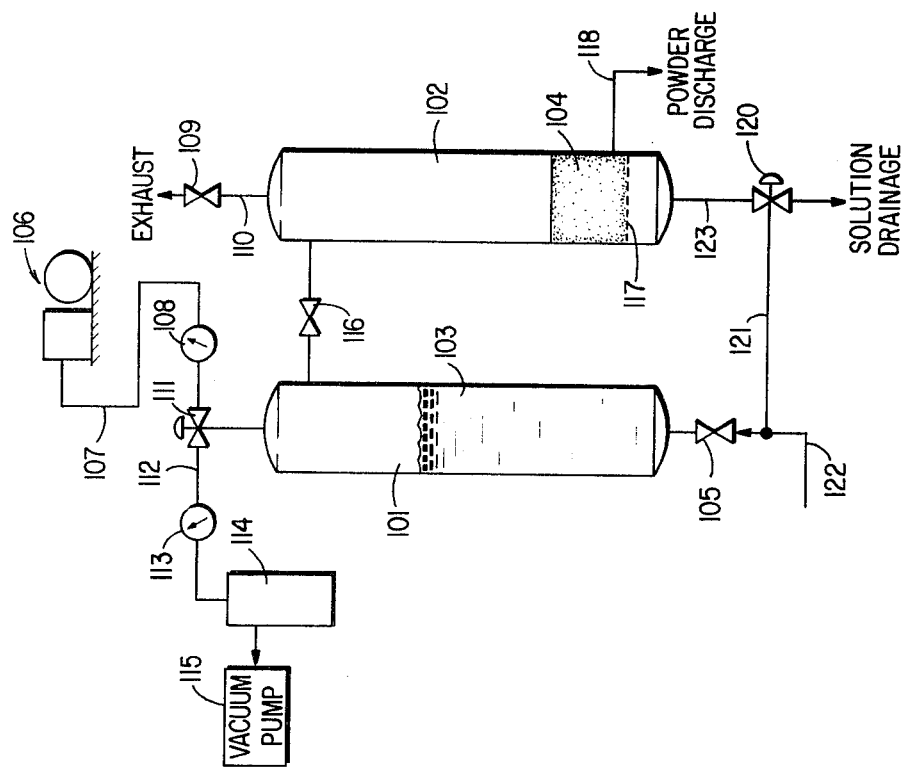
FIG. 1 illustrates a preferred method of impregnating diatomaceous earth, fly ash or mixtures thereof.

In mixing methods used for diatomaceous earth compositions other than the preferred methods shown in FIGS. 1 and 2, such as shear mixing, wet ball milling, and spray calcining, the residual water content after mixing is markedly increased thereby substantially increasing the cost of energy in drying the impregnated diatomaceous earth. This is exemplified by the following Table 3, showing comparative costs of drying.

TABLE 3

| Type of Mixing | Wt. % of Water In Impregnated Powder After Mixing | Heat of Vaporization (BTU) | Temp. of Mixing (°C.) | Electrical* Energy Cost ($) |
|---|---|---|---|---|
| Fluidized Mixing by the Invention (Example 1) | 40 | 640 | 80 | .01 |
| Shear Mixing (Example 12) | 65 | 1748 | 80 | .025 |
| Wet Ball Milling (Example 10) | 59 | 1400 | 30 | .023 |
| Spray Calcining | 80–90 | 4000–8700 | — | .06–0.13 |

*Calculated on the basis of 0.05 equals 1 kw/hr.

The following Table 4 illustrates the variation of properties of the foam quality as a function of different mixing methods. In each case, the diatomaceous earth was CELITE-535 (Johns-Manville) and the type and amount of impregnating constituents, and firing procedures were conducted as specified in the examples.

TABLE 4

| Mixing Method | Pore Size Distribution (mm) | Foam Density kg/m$^3$ (lbs/ft$^3$) | Total Processing Time (mm.) |
|---|---|---|---|
| Fluidized mixing by the Invention (Example 1) | 0.5–1.5 | 480 (33.0) | 15 to 30 |
| Ball Milling | | | |
| a - Wet (Example 10) | 0.5–5 | 648 (40.5) | 180 |
| b - Dry (Example 11) | DOES NOT FOAM | | |
| Shear Mixing (Example 12) | 0.5–2 | 688 (42.9) | 120 |

From Table 4, it can be seen that a foam glass produced from diatomaceous earth impregnated by the fluidized mixing method of the invention produces a foam glass of considerably less density, hence lower thermal conductivity.

It has been found that the amount of impregnating constituents incorporated in the diatomaceous earth varies with the mixing method utilized. Table 5 illustrates the variation in foam glass composition with differing mixing methods.

TABLE 5

| Component (wt %) | SiO$_2$ | B$_2$O$_3$ | Na$_2$O | K$_2$O | Al$_2$O$_3$ |
|---|---|---|---|---|---|
| Wet Ball Milling (Example 10) | 71.8 | 6.6 | 12.0 | 6.9 | 2.6 |
| Shear Mixing (Example 12) | 71.8 | 6.7 | 11.9 | 7.0 | 2.6 |
| Fluidized Mixing by the Invention (Example 1) | 68.5 | 7.7 | 13.0 | 7.7 | 2.9 |

It is apparent from the foregoing that fluidized mixing by the invention deposits more impregnating constituents than by other methods in diatomaceous earth compositions.

After mixing, impregnated diatomaceous earth, fly ash or mixtures thereof is dried to remove substantially all of the remaining water, preferably to less than about 5 weight percent, more preferably about 2 to 3 weight percent. The impregnated diatomaceous earth, fly ash or mixtures thereof is pulverized, preferably to a particle size less than 1 mm in a suitable pulverizing apparatus, such as a Pug Mill (Perry, *Chemical Engineers Handbook,* 5th Edition, 1973), or other conventional pulverizing means. The pulverized diatomaceous earth, fly ash or mixtures thereof is then cast into a mold of predetermined shape and placed in a furnace for firing, which foams the impregnated diatomaceous earth, fly ash or mixtures thereof. The impregnated material may stick to the mold requiring the use of a mold release agent. The preferred mold release agent is non-impregnated diatomaceous earth.

In single firing, the molded pulverized diatomaceous earth is foamed by heating in a furnace or other heating device to a final firing temperature above the glass transition temperature of the impregnated diatomaceous earth, preferably about 720° to 900° C., most preferably about 780° to 850° C., and is held at the final firing temperature so the center of the foam is heated at the final firing temperature for at least about 5 minutes. The heating rate is preferably about 10° to 30° C. per minute, although a heating rate as high as about 80° C. per minute may be used. The foregoing heating rates are considered typical for a foam about 2 cm thick. Heating rate will depend on the thickness of the foam. At the firing temperature the reaction of boron and/or silicon and alkali metal oxides with the surrounding refractory constituents of the diatomaceous earth reduces the viscosity of the mass, and the surface tension acts to seal off the open pores. Subsequently, gases generated by the thermal decomposition force each individual cell to grow in size and form a foam body.

In the most preferred method of single firing, the mold is heated to a temperature of about 350° to 600° C., preferably about 400° to 550° C. The mold is subjected to an isothermal heating for a sufficient period of time, generally about 3 minutes to 60 minutes, preferably about 20 to 40 minutes, to sinter the impregnated diatomaceous earth in the mold, and to enhance the preliminary reaction between the diatomaceous earth and impregnating constituents. After the period of isothermal heating, the temperature is raised to the final firing temperature of about 720° to 900° C., preferably about 780° to 850° C., to cause the impregnated diatomaceous earth to foam. The preferred heating rates, depending on the thickness of the foam, are about 10° to 30° C. per minute, although heating rates up to about 80° C. per minute may be used. The final firing temperature is maintained so the center of the mold is held at the final temperature for at least about 5 minutes, which stabilizes the foam, minimizing the number of open cells, and maximizing cell uniformity. Thereafter, the mold is cooled, and the foam glass body is obtained.

When shear mixing is used, the slurry is removed from the shear mixture and dried at a relatively low temperature, typically between about 100° and 200° C. Drying can be carried out in any conventional drying means such as belt dryers, up-flow air dryers, etc. If any other static drying method is employed, the dried aggregate may be ground before firing.

In order to obtain more uniform pore size distribution in the fly ash foams, as well as the low density diatomaceous earth foams, the double firing technique is used.

In the double firing technique, a carbohydrate foaming agent is used and is first carbonized at high temperature by firing the fly ash composition under reducing conditions and then the pre-fired material is ground and fired a second time under an oxidizing atmosphere in order to oxidize residual carbon to produce carbon oxide which subsequently foams the mass.

The double firing technique is required to produce foam glass with extremely uniform pore size distribution which is turn results in superior mechanical and insulation properties. In this technique, pre-mixed (impregnated) powders are fired to about 800° to 1100° C. under reducing conditions. The reducing condition can be established in the firing furnace either by (a) regulating the furnace atmosphere by injecting inert gases such as nitrogen, (b) using a sealed mold which inhibits penetration of oxygen into the powders, or (c) simply covering the mold with graphite which causes a reducing condition inside the mold. Consequently, the soluble carbohydrate of the impregnating solution undergoes an incomplete decomposition which disperses very fine carbon-rich particles into the sintered mass. The firing includes an isothermal heating at peak temperature for some period of time to allow complete reaction between the powder constituents and to fix the carbon into the mass. The fired article is then removed from the furnace and is allowed to cool at room temperature. The fired body is black, due to the carbonization of the foaming agent. A minor amount of foaming may take place during the first firing. However, if the reducing condition provided during the first firing is difficult to achieve, or is costly, it can be eliminated without any serious effect on the final foam density. The reason for this is that at above the softening temperature of the foaming material, a thin layer of glass will be formed on the surface layer which is directly exposed to the thermal radiation field of the firing furnace. The glassy film forms a seal which inhibits the further penetration of oxygen to the interior of the glass, thus generating a reducing condition in the interior of the glass.

The pre-fired mass is then ground in a conventional pulverizer. The effect of particle size of the crushed materials is noticeable in the final density of the foam glass. It has been observed that sieving the powders to less than about 355 micrometers is sufficient to produce foam glasses with extremely uniform pore size and low density; however, if the proportion of the coarser part (larger than about 355 micrometers) is less than approximately 20% of the total, sieving is not required.

The crushed powder is then poured into a mold which has been coated with a mold release agent such as silica. It is also feasible to make the firing molds from special high temperature alloys or ceramic molds with low surface wettability for glass which in turn eliminates the coating step. The pre-fired powders are then heated for the second time to about 800°–1000° C. under oxidizing conditions in order to react carbon with oxygen to produce carbon dioxide which subsequently foams the mass. The heating rate is preferred to be within about 5° to 20° C./min. The peak second firing temperature is between about 800° and 1000° C. depending upon the initial foam composition used, which determines the foam glass viscosity. The mechanism of pore generation is a dual function of temperature and time and must be optimized for individual compositions to result in controlled density and pore size. Moreover, the final soak at the second firing peak temperature is a determining factor in pore size and separatory wall thickness. The exposed surface of the foam glass can be "hardened" by injecting air into the firing furnace at elevated temperatures (i.e., about 800° C.) and the rate of injection can be controlled to facilitate complete oxidation of carbon at the foam glass surface layer.

The foam glass body made with a boron oxide containing glass former, alone or together with a silicon oxide glass former, will have a substantially water impermeable non-porous glaze or film on the outer surface. The foam glass will comprise about 6 to 10 weight percent boron oxide, about 18 to 22 weight percent alkali metal oxide, and the remainder (about 58 to 76 weight percent) substantially silica, alumina and iron oxide.

The quality (density, compressive strength, pore size distribution and thermal conductivity) of the foam is dependent on the type of diatomaceous earth, fly ash or mixture thereof used. The best foam glass is produced by using the flux-calcined grade diatomaceous earth. The natural grade diatomaceous earth produces a lower quality product. The calcined grade produces a product of intermediate quality. It must be understood that all the different types of diatomaceous earth can be used to produce usable foam glass, but most suitable types are calcined and flux-calcined grades, the most preferred type being flux-calcined grade, which produces an unexpectedly superior product.

Foam glass compositions made substantially from silica sand or fly ash, may preferably be mixed using a shear mixing technique.

As indicated above, the density, insulating properties, and crush and tensile strength of the foam glass can be varied based on the purpose for which its use is intended. For example, when used as roofing or siding material it is preferred the density of the foam glass be in the range of about 300 to 800 kg/m$^3$, and the thermal conductivity be in the range of about 0.1 to 0.3 W/m°k.

When used only for insulating purposes such as steam pipe insulation and interior insulation the insulating properties and the crush strength of the material are more important. Therefore, when used for such a purpose it is preferred that the density be about 100 to 300 kg/m$^3$, the thermal conductivity be about 0.05 to 0.1 W/m°k, and the crush strength be about 8000 to 20,000 Nm$^{-2}$.

When used as structural building materials, insulating properties are less of a factor, and density, crush and tensile strength are considered to be most important. Accordingly, when used for such a purpose it is preferred that the density be in the range of about 500 to 1100 kg/m$^3$, and the crush strength be in the range of about 30,000 to 80,000 Nm$^{-2}$.

In general, to achieve these properties, the pores in the foam glass will be of consistent size throughout, and will generally be in the range of 1 or less to 3 millimeters in diameter.

The invention is further illustrated by reference to the following examples which are typical, although results may vary somewhat when repeated. The impregnating solutions used in the example are set forth in the following Table 6:

TABLE 6

| | Na$_2$B$_4$O$_7$ 10 H$_2$O | H$_3$BO$_3$ | Na$_2$SiO$_3$ 5 H$_2$O | Na$_2$HPO$_4$ | Na$_3$PO$_4$ 12 H$_2$O | Na$_2$CO$_3$ | K$_2$CO$_3$ | NaHCO$_3$ | KHCO$_3$ | SUGAR | H$_2$O |
|---|---|---|---|---|---|---|---|---|---|---|---|
| A | 20 | — | — | — | — | 10 | 5 | 5 | 5 | | 55 |
| B | 20 | — | — | — | — | 10 | 10 | — | — | | 60 |
| C | — | 12.5 | — | — | — | 25 | — | — | — | | 62.5 |
| D | 5 | — | 15 | — | — | 8 | 8 | — | — | 1 | 64 |
| E | — | — | 30 | 6.5 | — | 4.2 | 4.6 | — | — | | 54.7 |
| F | — | — | 37.6 | — | — | 4.2 | 4.6 | — | — | | 53.6 |
| G | — | — | 28 | 5.6 | — | 4.2 | 4.6 | — | — | 2 | 57.6 |
| H | — | — | 20 | 6.4 | — | 2.4 | 7.0 | — | — | 2 | 63.2 |
| I | 9.2 | — | 27.8 | — | — | — | 9.2 | — | — | 2.8 | 60 |
| J | 8.6 | — | 26.0 | — | — | 6.6 | — | — | — | 2.6 | 56.2 |
| K | | | 27.9 | — | 14.9 | 2.4 | 4.6 | — | — | 2 | 50.2 |
| L | | | 30 | | | 9 | 4.6 | | | 2 | 56.4 |

Example 1

A foam glass was made from flux-calcined diatomaceous earth (Johns-Manville CELITE-535, Johns-Manville Products Corporation, Englewood Cliffs, N.J.) having a median pore size of 13.0 microns. The diatomaceous earth and impregnating Solution A were mixed in the apparatus shown in FIG. 1. A bed of 100 parts (by weight) of diatomaceous earth was placed in a heated vessel. 1400 parts (by weight) of impregnating solution was introduced in the bottom of the mixing vessel. Air was bubbled through the vessel for about 5.0 minutes. The excess impregnating solution was forced out the bottom of the vessel by applying a vacuum of about 0.5 atm for about 3 minutes. The introduction and removal of impregnating solution into the vessel was repeated once. The entire filling, mixing and removal of excess solution took 15 to 30 minutes. An impregnated diatomaceous earth was removed from the mixing vessel and was dried at 120° C. overnight (about 17 hours), pulverized to below 1 mm (45 mesh), and cast in a steel mold, using unimpregnated diatomaceous earth as a release agent. The mold was then transferred into a furnace, where it was heated at a rate of about 20° C./minute to about 450° C. The temperature was held constant at 450° C. for ¼ hour, after which the temperature was increased to about 800° C., and held constant for 10 minutes to foam the mixture. The foam product, was cooled to room temperature at an average cooling rate of about 10° to 15° C./minute. The foam product had a pore size distribution of 0.5 to 1.5 mm in diameter, a water impervious glaze, a mean compressive strength of 20×10$^3$ Nm$^{-2}$ and a density of about 530 kg/m$^3$. The thermal conductivity of the foam was about 0.18 W/m°k and had the following chemical analysis:

| | Weight % |
|---|---|
| SiO$_2$ | 70 |
| Al$_2$O$_3$ | 2.8 |
| B$_2$O$_3$ | 7.0 |
| Na$_2$O | 11.5 |
| K$_2$O | 6.4 |
| Other Oxides (Fe$_2$O$_3$, MgO, CaO, TiO$_2$, P$_2$O$_5$) | 2.1 |

Example 2

Example 1 was repeated using 90 parts CELITE-535 and 10 parts of petalite, as a water insoluble modifier. The final foam product had a uniform pore size, a water impervious glaze, a density of about 480 kg/m$^3$ and a compressive strength of about $18 \times 10^3$ Nm$^{-2}$.

Example 3

100 parts of the CELITE-535 was processed as in Example 1, but using impregnating Solution B. The final foam product has a very uniform pore size about 1 mm in diameter, a water impervious glaze, with a density of about 660 kg/m$^3$ and a compressive strength of about $18 \times 10^3$ Nm$^{-2}$.

Example 4

Example 1 was repeated using impregnating Solution A having about 3 weight percent sugar added thereto. The foam product had a very uniform pore size, a water impervious glaze, a density of about 670 kg/m$^3$ and a compressive strength of about $37 \times 10^3$ Nm$^{-2}$.

Example 5

Flux calcined diatomaceous earth was used in making a foam glass. A bed of CELITE-535 was formed in a resistance heated vessel. The impregnating solution was Solution C. Mixing was conducted by the procedures used in Example 6. Impregnated diatomaceous earth was dried at about 120° C. for about 17 hours, pulverized to less than 1 mm and poured into a steel mold utilizing nonimpregnated diatomaceous earth as a mold release agent. The mold was heated at about 400° C. for about ½ to 1 hour before raising the temperature to the final firing temperature of 810° C. for 10 minutes. A foam glass was produced with a faint greenish color and uniform pore size ranging from 2 mm to less than 1 mm. The foam had a density of about 500 kg/m$^3$ and had a compressive strength of $12 \times 10^3$ Nm$^{-2}$. The foam glass had a water impervious glaze.

Example 6

This example demonstrates making a foam glass using a silicate based impregnating solution. Impregnating Solution B having about 1 weight percent sugar added thereto was mixed at about 50° to 60° C. The impregnating solution and diatomaceous earth were mixed as described in FIG. 2. A bed of one liter of KENITE 2500 (Witco Chemicals) was placed in a heated mixing vessel. Impregnating solution was continuously passed to the bottom of the vessel at a flow rate was about 50 liters/min./m$^2$. The solution was continuously recycled to the mixing vessel which was maintained at a temperature about 60° C., for a period of 10-15 minutes. The excess impregnating solution was removed by the application of a vacuum of 0.3 atm by a vacuum pump to force the impregnating solution from the impregnated diatomaceous earth. The water content of the impregnated powder was about 42% by weight, which was then dried in an oven at 120° C. for about 17 hours (overnight). The dried powder was pulverized in a Pug Mill to a size of about 45 mesh and finer prior to initiating the firing procedure specified in Example 2. The foam product had a relatively uniform pore size with a high population of pores between 1-3 mm, although a very few larger pores about 8 mm in diameter were also present. The foam product had a black color, a low density of 230 kg/m$^3$ and compressive strength values of $6 \times 10^3$ Nm$^{-2}$. The measured thermal conductivity was about 0.14 W/m°k.

Example 7

Example 6 was repeated with 25 weight percent of diatomaceous earth being replaced with volcanic ash (pumice). The final foam had pores which were better sealed (i.e. less permeable to water) than the foam product in Example 2. The foam density was about 250 kg/m$^3$.

Example 7a

Example 7 was repeated using 50 weight percent CELITE-535 and 50 weight percent volcanic ash. The foam had a pore distribution of 1 to 2 mm, a density of 530 kg/m$^3$, and a compressive strength of $24 \times 10^3$ Nm$^{-2}$.

Example 8

This example illustrates the effects of substituting volcanic ash for diatomaceous earth using boron oxide containing compound based solutions (borax solutions). The impregnating solution was Solution A with about 1 weight percent sugar added thereto. The mixing and firing was conducted as described in Example 6. The results are tabulated below:

| Powder Mixture | | Pore size, | |
| --- | --- | --- | --- |
| CELITE-535 (wt %) | Volcanic (Ash) (wt %) | major population (mm) | Density kg/cm$^3$ |
| 100 | 0 | 1-3 | 540 |
| 75 | 25 | 1-3 | 410 |
| 50 | 50 | 0.2-1 | 880 |

Example 9

This example illustrates the foam products obtained using solutions containing a mixture of boric oxide and silicon oxide containing compounds (i.e. mixture of borax and sodium silicate). An impregnating solution consisting of Solution D having about 1 weight percent sugar added thereto was prepared at 80° C. CELITE-535 was used. Processing was carried out by the same method described in Example 6. The foam product had a uniform pore size distribution with sealed pores with a density of about 260 kg/m$^3$ and a compressive strength of $7 \times 10^3$ Nm$^{-2}$.

Example 10

100 parts (by weight) of CELITE-535 was wet ball milled with 40 parts borax, 20 parts Na$_2$CO$_3$, 10 parts K$_2$CO$_3$, 10 parts NaHCO$_3$, 10 parts KHCO$_3$ and 230 parts water for 3 hours in a rubber lined jar mill with alumina balls. The slurry was dryed and ground in a Pug Mill to less than 1 mm (45 mesh). The ground powder was cast in a steel mold using nonimpregnated diatomaceous earth as a mold release agent and fired to 800° C. according to the procedure given in Example 1. The foam product had a pore size distribution about 0.5 to 5 mm in diameter, a density of about 650 kg/m$^3$ and a compressive strength of about $16 \times 10^3$ Nm$^{-2}$. Mixing by wet ball milling takes longer to process, results in a less uniform pore distribution than by processing in accordance with the invention.

Example 11

A dry mixture of CELITE-535 and impregnating constituents was prepared as follows: 100 parts of CELITE-535 (by weight), 20 parts borax, 12 parts $Na_2CO_3$, and 12 parts $K_2CO_3$ were dry ball milled for about 4-6 hours. The milled powder was screened through a 1 mm (45 mesh) sieve, cast in a steel mold with mold release agent and fired to 800° C. according to the procedure given in Example 1. The mixture sintered to a dense mass.

Example 12

This example illustrates the production of foam glass from diatomaceous earth by shear mixing. 100 parts (by weight) of CELITE-535 was shear mixed in a blunger (William Bolten Ltd., Bulletin News, Vol. 1, No. 7) with 30 parts borax, 15 parts $Na_2CO_3$, 7.5 parts $K_2CO_3$, 7.5 parts $NaHCO_3$, 7.5 parts $KHCO_3$, and 262.5 parts water. The temperature of the mixture maintained at 80° C. and mixing was continued for 2 hours. The slurry was discharged from the blunger, dried and ground to less than 1 mm (45 mesh size). The dried mixture was cast in a tin mold and fired according to the procedure given in Example 1. The product had a pore distribution of about 0.5 to 2 mm in diameter, a density of about 690 $kg/m^3$ and a compressive strength of about $20 \times 10^3$ $Nm^{-2}$. Shear mixing diatomaceous earth produces a foam glass of inferior distribution that has less strength. Processing requires more water and longer processing time, than by impregnating in accordance with the invention.

Example 13

This example shows the effect of shear mixing to impregnate natural grade diatomaceous earth.

250 parts (by weight) of natural grade diatomaceous earth (FILTER-CEL) mixed with 75 parts borax decahydrate, 37.5 parts $Na_2CO_3$, 18.7 parts $K_2CO_3$, 18.7 parts $KHCO_3$, 18.7 parts $NaHCO_3$ and 656 parts water. The slurry was mixed in a shear mixer for about 2 hours at a temperature of about 80° C. The slurry was dryed at about 120° C., pulverized in a Pug Mill to a particle size less than 1 mm and cast into a steel mold containing diatomaceous earth as a release agent for firing. Firing was carried out with the same procedure given in Example 1. The foam product was allowed to cool to room temperature. The final foam product had a relatively uniform pore size ranging from less than 1 mm to about 2 mm and a density of about 640 $kg/m^3$.

Examples 14 through 17 are attempts at making foam glass with the teachings of U.S. Pat. No. 3,784,861 to Kurz.

Example 14

160 parts by weight of aqueous sodium silicate 48°/50° Be and 40 parts by weight of water were added to 40 parts by weight of natural grade diatomaceous earth, (FILTER CELL - Johns-Manville) containing 0.5% by weight carbon black, 40 parts by weight of micro-talc and 5 parts by weight of gypsum. The mixture was then kneaded into a dough which became slightly moist on the surface. The dough was placed in a metallic mold, and the mold and contents were transferred to an oven and heated for between 1½ and 2 hours to about 840° C. The product was held for about 10 minutes at the highest temperature, and then was cooled for several hours. The product had a light brown color with a very non-uniform pore-size distribution. The pore size distribution varied from less than 1 mm to about 2 cm in diameter. Despite the long annealing time, the product cracked in the mold then cooled to room temperature. The pores were not discrete and substantial communication between pore was evidenced.

Example 15

A composition containing the same constituents as those of Example 14, and blended in the same quantities, was heated to a temperature of about 250° C. and maintained at that temperature for about 2 to 3 hours until most of the water had evaporated. The resulting product was then cooled and pulverized. The granulate obtained was heated to a temperature slightly above 900° C. and for about 5 minutes and annealed to room temperature for about 2 to 3 hours. The foam product had a more uniform pore size distribution than the one obtained in Example 9; however, the product was unsuitable for structural usage, and had a pore size distribution ranging from about 1 mm to 1 cm in diameter. The product had a white color, with a density of about 640 $kg/m^3$ and a compressive strength of about $13 \times 10^3$ $Nm^{-2}$. The foam glass had pores in substantial communication, permeable to water, and exhibited high thermal conductivity.

Example 16

160 parts by weight of aqueous sodium silicate with 48°/50° Be was mixed with 40 parts by weight of crushed expanded perlite (less than 150 micrometer particle size) containing 0.5 weight percent carbon black, 40 parts by weight micro talc, 5 parts by weight of gypsum and 40 parts by weight water. The doughy mixture was blended thoroughly in a container using an overhead stirrer. The slurry formed was very dilute which became harder after several hours being left at room temperature uncovered, e.g., due to losing water by evaporation. The mixture subsequently was placed in a steel mold and heated in a furnace to about 840° C. in a 2-hour period, at a rate of 400° C./hr. The product was held at the highest firing temperature for about 5 minutes and then was allowed to cool to room temperature slowly for several hours. The resulting foam product had an extremely non-uniform pore distribution with irregular pores having an average diameter ranging from less than a millimeter to more than a centimeter. In spite of long annealing time, the product was not mechanically sound and cracked extensively at the mold-foam interface.

Example 17

The mixture used in Example 16 was heated to 250° C. and held at this temperature for 2 hours. The resulting aggregate was hard and brittle. The aggregate was pulverized to about less than 45 mesh. The granular material obtained was placed in a metallic mold and heated in a furnace with the same procedure outlined in Example 1 to about 530° C. and cooled to room temperature. The product is somewhat improved in pore size distribution in its interior section, but large voids formed at the exterior. The product had a pore size of about 1 cm in diameter, had a very poor chemical durability, and disintegrated upon contact with water.

Example 18

This example illustrates the performance of hydrocarbon foaming agents, for example glycerin, starch and succinic acid as foaming agents in the double firing method.

A powder formulation consisting of 90% by weight diatomaceous earth (CELITE 535) and 10% by weight calcined fly ash was impregnated in a fluidized bed with Solution E. In the case of starch, sodium phosphate inhibited dissolution of starch in the impregnating solution. To overcome the problem, a new Solution F was used in which a sodium oxide derivative of sodium phosphate compensated with the addition of extra sodium silicate was added to the solution. Therefore, in both solutions the amount of $Na_2O$ per 100 grms of solution was approximately the same. In all cases, 2 grms of foaming agent was added per 100 gms of impregnating solution.

The impregnation was carried out in the fluidized column using about 8 liters of solution per one kilogram of powders using a flow rate of about 0.62 liters/min $m^2$ at a temperature of about 65° to 70° C. Air fluidizing time was about 20 minutes. After the termination of impregnation, the solution was drained by applying a vacuum. The moisture content of the impregnated powders, before drying at 175° C., was about 40 weight percent for succinic acid, 40 weight percent for sugar, 44 weight percent for glycerin and about 45 weight percent for starch.

After drying, the powders were pulverized to a size less than 45 mesh and poured into stainless steel molds with graphite covers. First firing was carried out at about 1000° C. using a heating rate of approximately 10°–15° C./min. The foaming materials were soaked at peak firing temperature for about 30 minutes prior to cooling to room temperature. The pre-fired materials were ground and sieved through 45 mesh screen size after which they were fired again in a steel mold without graphite cover to about 890° C. with 10 minutes soak time. The foam materials were allowed to cool slowly to below 200° C. Using sugar and glycerin impregnating solutions resulted in light weight foams whereas succinic acid and starch produced dense, glazed foams. The final foam density obtained using various foaming agents are summarized below:

| Foaming Agent | Final Foam Density in kg/m$^3$ |
| --- | --- |
| Sugar | 160 |
| Glycerin | 220 |
| Starch | 1880 |
| Succinic Acid | 2000 |

Example 19

The example illustrates the results obtained regarding final foam density when the first firing is carried out under a reducing atmosphere as compared to an oxidizing atmosphere.

A powder formulation consisting of 80% by weight diatomaceous earth (CELITE 535) and 20% by weight calcined fly ash was used. The powders were impregnated in a fluidized bed with Solution E in which the foaming agent was sugar. The impregnation was carried out in a fluidized column similar to Example 18. The impregnated powders had a moisture content of about 35 weight percent. Prior to firing, the powders were dried in a drying oven at about 175° C. for several hours, and were then ground to below a 45 mesh particle size. The powders were first fired to 1000° C. for 30 minutes in steel molds with and without the graphite cover and cooled to room temperature for grinding to below 45 mesh. Second firing peak temperature was set at 900° C. for 10 minutes soak time for both types of pre-fired materials. After cooling to room temperature, samples were inspected for pore structure and density. The following table summarizes the results:

| 1st Firing Condition | Avg Pore Size (mm) | Density (kg/m$^3$) |
| --- | --- | --- |
| Graphite Cover | 1.5 | 180 |
| No Graphite Cover | 1.5 | 200 |

Both foams have uniform closed pore structure; density has been slightly increased in the foam sample which was fired without graphite cover, mainly due to the higher carbon burnout during the first firing.

Example 20

This example illustrates the effect of fly ash calcination on foam properties.

A powder formulation with 80 weight percent diatomaceous earth (CELITE 535) and 20 weight percent non-calcined fly ash as received, was impregnated in a fluidized bed with Solution G.

The impregnation procedure of Example 18 was carried out, followed by double firing in which the first peak firing temperature was set at 1000° C. and the second peak firing temperature was set at 875° C. The foam glass product has a non-uniform pore structure with pores varying in size from 1 mm to about 6 mm in diameter with a non-glassy appearance. Thus, the pore sizes varied greatly and the pores were not evenly distributed.

Example 21

This example illustrates the method of producing foams with high fly ash content.

Diatomaceous earth can be formulated with as much as 50 weight percent fly ash and yet produce light weight foam glass. The following example illustrates a method of making a light weight foam glass with a high concentration of fly ash.

A powder formulation of 50 weight percent diatomaceous earth (KENITE 2500) and 50 weight percent calcined fly ash was impregnated in a fluidized bed with Solution E having about 2 weight percent added thereto. The impregnation procedure was similar to the one given in Example 18. Impregnated powders were double fired at peak firing temperatures of 1000° C. and 900° C. for 30 and 10 minutes, respectively. The foam product had a green color with a very uniform pore structure of about 2 mm in diameter, a density equal to 190 kg/m$^3$ and a thermal conductivity of 0.07 W/m°k.

Example 22

This example illustrates that the specific type of diatomaceous earth used does not affect the final foam properties.

The following example illustrates that types of diatomaceous earth supplied by different manufacturers do not affect the final foam properties. CELITE 535 and KENITE 2500, supplied by Johns Manville and Witco Chemical, respectively, were utilized in foam making. Their compositions, which have been given previously, indicate that CELITE 535 contains slightly more alumina and less silica than KENITE 2500.

Powder formulations of 70 weight percent diatomaceous earth and 30 weight percent calcined fly ash were impregnated in a fluidized bed with Solution G. The powders were processed according to the procedure given in Example 18, except that peak temperatures at first and second firing were set at 900° C. and 850° C., respectively. The following results were obtained:

| Type of Diatomaceous Earth | Density (kg/m$^3$) | Theoretical Thermal Conductivity (W/m°k) |
|---|---|---|
| CELITE 535 | 165 | .061 |
| KENITE 2500 | 170 | .063 |

Example 23

This example illustrates the differences obtained in the foam when the amount of fluxes is varied.

The viscosity of the foaming mass and consequently the foam glass density can be altered by either varying the base powder formulation, the concentration of fluxes in the impregnating solutions or both. For example, higher amounts of fly ash in the powder formulation results in higher concentrations of alumina in the foaming mixture thus increasing the viscosity. However the viscosity can be lowered by introducing more fluxes into the impregnating solution.

This example illustrates the effect of impregnating solution compositions on the final foam density and composition, while keeping the powder formulation unchanged.

A powder formulation of 80 weight percent diatomaceous earth (CELITE 535) and 20 weight percent calcined fly ash and Solutions G and H were used. An impregnating procedure similar to the one given in Example 19 was carried out which was followed by a double firing in which the peak temperatures were set at 950° C. and 825° C. for the first and second firings, respectively. Below are listed the chemical compositions and densities of the resulting foam glasses.

|  | Thermal Conductivity W/m°k | | | Chemical Analysis | | | | | | | | |
|---|---|---|---|---|---|---|---|---|---|---|---|---|
|  | $d$lb/ft$^3$ | expt | theo | SiO$_2$ | Al$_2$O$_3$ | P$_2$O$_5$ | Na$_2$O | K$_2$O | Fe$_2$O$_3$ | CaO | MgO | TiO$_2$ |
| Foam Glass From Solution H | 230 | | .081 | 66.0 | 6.5 | 3.7 | 12.5 | 7.2 | 2.3 | .85 | .4 | .32 |
| Foam Glass From Solution G | 200 | .072 | .072 | 62.3 | 6.4 | 3.4 | 18.5 | 5.9 | 1.9 | .82 | .3 | .3 |

One objective of this invention is to make built-in insulation in concrete walls. In this method the inner face of the concrete wall is bonded to a layer of foam glass, simply by forming the concrete walls in molds having at least one side made from foam glass.

Example 24

This example illustrates the bonding of foam glass to concrete. Foam glass materials such as shown in Example 23 can be used for "composite concrete-foam glass" walls. Low density foams according to the methods described in the previous examples were used. Forming molds were made, and their bottom ends were sealed with slabs of foam glass. Concrete mix was poured into the forms and allowed to set for a few days. The sides of the forms were removed, and the composite concrete-foam glass slabs were subjected to stress to test the strength of the concrete-foam glass bond. The test illustrated that the composite concrete-foam glass structure always fractured in the foam glass region, while the concrete-foam glass bond remained intact.

Example 25

This example illustrates a method of producing a density gradient in foam glass by injecting oxygen or air during the second firing. This example is in accordance with the description of the double-firing technique.

A powder formulation of 90 weight percent diatomaceous earth and 10 weight percent calcined fly ash was impregnated with Solution G. The impregnation procedure was similar to that in Example 18. First firing was carried out with a graphite cover at 1000° C. for 30 minutes. The sintered mass was ground and seived through a 45 mesh screen prior to the second firing. The pre-fired powders were fired at 700° C. and oxygen was injected into the firing furnace. Heating under an oxygen atmosphere was continued to about 900° C. with a soak time of about 10 minutes. The foam material was cooled to room temperature and inspected for density gradient. A top layer having a thickness of approximately 5 mm had formed, having a greenish color and an average density of about 480 kg/m$^3$. The average density of the foam glass in the interior was about 240 kg/m$^3$. The foam object consequently exhibited high impact resistance on the outside face.

Example 26

The following example illustrates foam objects made from varying mixtures of fly ash/silica sand and their final properties.

100 parts of powder formulations consisting of: calcined fly ash from 30 to 100 weight percent and 325 mesh silica sand from 0 to 70 weight percent were mixed with 100 parts of Solution I to form a slurry having a good consistency. Mixing was carried out in a shear mixer at a temperature of about 60° C., for about one hour. The slurry was then poured into a steel pan and dried at 125° C. The dry aggregate was pulverized and seived through a 45 mesh screen and double fired. The first firing was done in steel molds, with graphite covers, to about 1000° C. with 30 minutes soak at the peak firing temperature. The second firing was also carried out in steel molds, however the pre-fired powder was coated with diatomaceous earth for the second firing, without graphite. The compositions were heated to the appropriate firing temperatures, which varied from about 870° C. to 1000° C. depending upon the powder formulation used. The foam was soaked at the peak firing temperature for about 10 minutes, and then the foam glass was cooled to room temperature and tested for its physical properties.

The second firing temperature, foam density, calculated R-value, calculated fast crushing strength and average pore size of the foam glasses are summarized below:

| Powder Formulation Fly ash: Silica sand | 2nd Firing Temp °C. | Density kg/m³ | Thermal Conductivity W/m°k | Cr. St. in Nm⁻² | Pore Size* mm |
|---|---|---|---|---|---|
| 100:0 | 1000 | 690 | .23 | 32 × 10³ | 1 |
| 80:20 | 980 | 420 | .14 | 19 × 10³ | 2 |
| 70:30 | 920 | 390 | .13 | 18 × 10³ | 1 |
| 60:40 | 920 | 300 | .10 | 14 × 10³ | 1 |
| 50:50 | 900 | 330 | .11 | 15 × 10³ | 1 |
| 30:70 | 875 | 440 | .14 | 20 × 10³ | 2 |

*All the foams have closed pore structure.
measures the crush strength of the foam glass article.

Example 27

The following examples illustrate the physical properties of the foam glass when $K_2CO_3$ is replaced with $Na_2CO_3$ as compared with Example 26.

100 parts of various powder formulations of calcined fly ash and silica sand were mixed with 100 parts of Solution J. The processing procedures were similar to Example 19. Results are summarized below.

| Powder Formulation Fly ash: Silica sand | 2nd Firing Temp °C. | Density kg/m³ | Thermal Conductivity W/m °k. | Cr. St. in Nm⁻² | Pore Size mm |
|---|---|---|---|---|---|
| 50:50 | 920 | 360 | .12 | 17 × 10³ | 1–4 |
| 60:40 | 890 | 440 | .15 | 21 × 10³ | 1 |
| 70:30 | 920 | 400 | .13 | 18 × 10³ | 1 |
| 80:20 | 950 | 430 | 14 | 20 × 10³ | 3 |

Example 28

The following example illustrates the replacement of silica sand with volcanic ash (Tuff).

A powder formulation of 50 parts calcined fly ash and 50 parts ground Tuff (−45 mesh) was mixed with 100 parts of Solution I. The mixing and the firing procedures were identical to Example 19, with the peak second firing at 875° C. The foam material had a green color with a very uniform closed-pore structure with an average size of about 1 mm in diameter. The foam density was 530 kg/m³.

Example 29

This example illustrates the performance of different additives in the powder formulation of diatomaceous earth.

Powder formulations consisting of 90 weight percent diatomaceous earth (CELITE 535) and 10 weight percent of either waste glass powder, (for example, broken glass bottles) calcined fly ash or finely ground volcanic ash were prepared and impregnated with Solution K. Impregnation was carried out with a procedure similar to that in Example 19. The impregnated powders were dried at 125° C. and ground to −45 mesh. In all the cases, first firing was carried out at about 1000° C. with 30 minutes soak, whereas the second firing peak temperature was set at about 900° C. for about 10 minutes soak time. Foam objects were allowed to cool slowly to room temperature and inspected for pore structure and density. The results are summarized below:

| Type of Additive | Avg Pore Size | Density (kg/m³) |
|---|---|---|
| Waste Glass Powder | 1 | 250 |
| Calcined Fly Ash | 1 | 210 |

-continued

| Type of Additive | Avg Pore Size | Density (kg/m³) |
|---|---|---|
| Volcanic Ash | 1 | 220 |

All foams had excellent pore size uniformity.

Example 30

This example illustrates that phosphate compounds when present in the impregnating solution improve the foam glass quality, especially its pore uniformity. Additionally, when potassium oxide is replaced with sodium oxide, this results in degradation of foam glass quality.

Powder formulations of 80 weight percent diatomaceous earth and 20 weight percent calcined fly ash were impregnated with Solutions E and F each having 2 weight percent sugar added thereto and Solution L. The impregnation and double firing techniques used in Example 18 were carried out. The results are summarized below:

| Solution Used for Impregnation | Pore Structure (Avg Diam mm) | Density kg/m³ |
|---|---|---|
| E | Very uniform (1.5) | 160 |
| F | Non-uniform pores from .5–5 | 190 |
| L | Very thick separatory walls | Very dense foam |

Although the invention has been described in considerable detail, with reference to certain preferred embodiments, it is to be understood that variations and modifications can be made within the spirit and scope of the invention, as described hereinbefore, and described in the appended claims.

What is claimed is:

1. A process for making a foam glass body from diatomaceous earth, fly ash, volcanic ash and mixtures thereof comprising:
    (a) impregnating diatomaceous earth, fly ash, volcanic ash or a mixture thereof with an impregnating solution comprising at least one water soluble glass former, at least one water soluble flux, at least one water soluble carbohydrate gas generator, and water to form an impregnated material;
    (b) heating the impregnated material above the glass transition temperature of the impregnated material;
    (c) cooling the impregnated material;
    (d) pulverizing the cooled impregnated material; and
    (e) heating the pulverized impregnated material in an oxidizing atmosphere to a sufficient temperature to cause foaming of the impregnated material thereof thereby forming a foam glass body.

2. A process for making a foam glass body comprising:
    (a) heating diatomaceous earth, fly ash, wash ash or a mixture thereof to at least 500° C. to form a calcined material;
    (b) impregnating the calcined material with an impregnating solution comprising at least one water soluble glass former, at least one water soluble flux, at least one water soluble gas generator, and water;
    (c) heating the impregnated material to a sufficient temperature to cause foaming of the impregnated material thereby forming a foam glass body; and
    (d) cooling the foam glass body.

3. A process for making a foam glass body from diatomaceous earth or a mixture of diatomaceous earth and fly ash comprising:
   (a) forming a bed of diatomaceous earth or a mixture of diatomaceous earth and fly ash;
   (b) passing an impregnating solution through the bed to impregnate the diatomaceous earth or mixture of diatomaceous earth and fly ash and form an impregnated material, said impregnating solution comprising at least one water soluble glass former, at least one water soluble flux, at least one water soluble gas generator, and water;
   (c) heating the impregnated material to a sufficient temperature to cause foaming of the impregnated material thereby forming a foam glass body; and
   (d) cooling the foam glass body.

4. The process of claims 1, 2 or 3, wherein the diatomaceous earth is calcined diatomaceous earth.

5. The process of claims 1, 2 or 3, wherein the diatomaceous earth is flux-calcined diatomaceous earth.

6. The process of claims 1, 2 or 3, wherein the fly ash is calcined fly ash.

7. The process of claims 1, 2, or 3, wherein the impregnated material is dried to a water content less than about 5 weight percent, pulverized to a particle size less than 1 mm, and placed in a mold prior to heating.

8. The process of claims 1, 2 or 3, wherein the impregnated solution is at a temperature of about 50° to 100° C.

9. The process of claims 1, 2 or 3, wherein the temperature which causes foaming is about 720° to 1000° C.

10. The process of claim 1 wherein the impregnated material is heated to about 800° to 1100° C. and the pulverized impregnated material is heated to about 800° to 1000° C.

11. The process of claims 2 or 3, wherein step (c) is conducted by a first heating to a temperature of about 350° to 600° C. for a sufficient period of time to sinter the impregnated material, and a second heating of the sintered material to a temperature of about 720° to 900° C. for sufficient time to stabilize the foam glass body.

12. The process of claim 11, wherein the first heating and second heating are at a heating rate of about 10° to 80° C. per minute.

13. The method of claim 3, wherein the impregnating solution is passed through the bed by continuously introducing impregnating solution at a point below the bed at sufficient velocity to fluidize the bed.

14. The method of claim 13, wherein the impregnating solution is continuously recycled.

15. The process of claim 3, wherein a gas is passed upwardly through the bed and impregnating solution to fluidize the bed.

16. The process of claim 15, wherein the gas is air.

17. The process of claims 1, 2, or 3, wherein the impregnating solution contains water soluble glass former in an amount expressed as its oxide of about 3 to 14 weight percent, water soluble flux in an amount expressed as its oxide of about 10 to 20 weight percent, and water in an amount of about 50 to 80 weight percent.

18. The process of claim 17, wherein the water soluble glass former is a member of the group consisting of a boron oxide containing compound, a silicon oxide containing compound, a phosphorus oxide containing compound and mixtures thereof.

19. The process of claim 18, wherein the boron oxide containing compound is selected from the group consisting of boric acid, alkali metal borate, and mixtures thereof.

20. The process of claim 19, wherein the alkali metal borate is sodium borate.

21. The process of claim 18, wherein the silicon oxide containing compound is an alkali metal silicate.

22. The process of claim 21, wherein the alkali metal silicate is selected from the group consisting of sodium silicate and potassium silicate.

23. The process of claim 18, wherein the phosphorus oxide containing compound is an alkali metal phosphate.

24. The process of claim 23, wherein the alkali metal phosphate is selected from the group consisting of sodium phosphate and potassium phosphate.

25. The process of claim 17, wherein the water soluble flux is an alkali metal flux.

26. The process of claim 25, wherein the alkali metal of the alkali metal flux is selected from the group consisting of sodium, potassium, and mixtures thereof.

27. The process of claim 17, wherein the gas generator is a carbon oxide gas generator.

28. The process of claims 2 or 3, wherein the carbon oxide gas generator is selected from the group consisting of carbonates, bicarbonates, carbohydrates, and mixtures thereof.

29. The process of claim 1, wherein the carbohydrate is selected from the group consisting of sugar and glycerin.

30. The process of claims 1, 2, or 3, wherein the impregnated material contains modifiers selected from the group consisting of volcanic ash, petalite, perlite, sand, silica dust, clays, refractory slags, gypsum, talc, glass powder, refractory fibrous material, naturally occurring minerals and oxides, and mixtures thereof.

31. The process of claim 30, wherein the modifier is volcanic ash.

32. The process of claims 1, 2 or 3, wherein the diatomaceous earth has a median pore size of about 1.5 to 22 microns.

33. The process of claims 1, 2 or 3, wherein the water soluble glass former is selected from the group consisting of boric acid, alkali metal borates and mixtures thereof, in an amount expressed as boron oxide of about 4 to 9 weight percent of the solution, the flux is selected from the group consisting of alkali metal carbonates, alkali metal bicarbonates, alkali metal borates, alkali metal silicates, alkali metal phosphates and mixtures thereof in an amount expressed as alkali metal oxide of about 12 to 16 weight percent of the impregnating solution, the gas generator is a carbon oxide gas generator, and water is present in an amount of about 55 to 70 weight percent of the solution.

34. The process of claims 1, 2 or 3, wherein the water soluble glass former is an alkali metal silicate in an amount expressed as silicon oxide of about 5 to 11 weight percent of the solution, the flux is an alkali metal carbonate, alkali metal bicarbonate, alkali metal borate, alkali metal silicate, alkali metal phosphate, or mixture thereof in an amount expressed as alkali metal oxide of about 12 to 19 weight percent of the impregnating solution, the gas generator is a carbon oxide gas generator, and water is present in an amount of about 55 to 70 weight percent of the solution.

35. The process of claims 1, 2 or 3, wherein the water soluble glass former is a mixture of an alkali metal silicate and a boron oxide containing compound selected from the group consisting of boric acid, alkali metal borates, and mixtures thereof, in an amount expressed as their oxide of about 5 to 14 weight percent of the solution, the boron oxide containing compound being present in solution in an amount expressed as boron oxide greater than about 0.5 weight percent, the flux is alkali metal carbonate, alkali metal bicarbonate, alkali metal borate, alkali metal silicate, alkali metal phosphate, or mixture thereof in an amount expressed as alkali metal oxide of about 12 to 19 weight percent of the impregnating solution, the gas generator is a carbon oxide gas generator, and water is present in an amount of about 55 to 70 weight percent of the solution.

36. The process of claims 1, 2 or 3, wherein the water soluble glass former is a mixture of an alkali metal silicate and a phosphorus oxide containing compound selected from the group consisting of alkali metal phosphates in an amount expressed as their oxide of about 5 to 14 weight percent of the solution, the phosphorus oxide containing compound being present in solution in an amount expressed as phosphorus oxide greater than about 0.5 weight percent, the flux is alkali metal carbonate, alkali metal bicarbonate, alkali metal borate, alkali metal silicate, alkali metal phosphate, or mixture thereof in an amount expressed as alkali metal oxide of about 12 to 19 weight percent of the impregnating solution, the gas generator is a carbon oxide gas generator, and water is present in an amount of about 55 to 70 weight percent of the solution.

37. The process of claims 1, 2 or 3, wherein the impregnating solution is maintained at a pH greater than 11.

38. The process of claims 1, 2 or 3, wherein the diatomaceous earth is selected from the group consisting of calcined diatomaceous earth and flux-calcined diatomaceous earth and the fly ash is calcined fly ash.

39. The process of claim 3, wherein excess impregnating solution is removed from the bed of impregnated diatomaceous earth or mixture of diatomaceous earth and fly ash by applying a pressure differential across the bed.

40. A process for making a foam glass body from diatomaceous earth, fly ash or a mixture thereof comprising:
  (a) impregnating diatomaceous earth, fly ash or a mixture thereof using an impregnating solution comprising at least one water soluble glass former selected from the group consisting of boron oxide containing compound, and a mixture of a boron oxide containing compound and a silicon oxide containing compound, in an amount expressed as their oxide of about 3 to 20 weight percent, at least one water soluble alkali metal flux, in an amount expressed as alkali oxide of about 10 to 20 weight percent, at least one water soluble gas generator, and water in an amount of about 50 to 80 weight percent;
  (b) heating the impregnated diatomaceous earth, fly ash or mixture thereof to a sufficient temperature to cause foaming of the impregnated diatomaceous earth, fly ash or mixture thereof, thereby forming a foam glass body; and
  (c) cooling the foam glass body having a surface glaze.

41. The process of claim 40, wherein the boron oxide containing compound is present in an amount of about 4 to 9 weight percent, the alkali metal flux is present in an amount of between about 12 to 16 weight percent, the gas generator is carbon oxide gas generator and is present in an amount expressed as carbon of about 1.5 to 3.5 weight percent, and water is present in an amount of about 55 to 70 weight percent.

42. The process of claim 40, wherein the mixture of silicon oxide containing compound and boron oxide containing compound are present in solution in an amount of about 5 to 14 weight percent, the alkali metal flux is present in solution in an amount of about 12 to 19 weight percent, the gas generator is a carbon dioxide gas generator and is present in solution in an amount expressed as carbon of about 1.5 to 3.5 weight percent, and water is present in an amount of about 55 to 70 weight percent, said boron oxide containing compound being present in solution in an amount greater than about 0.5 weight percent.

43. The process of claim 42, wherein said boron oxide containing compound is present in solution in an amount greater than about 1 weight percent.

44. The process of claims 40, 41 or 42, wherein the boron oxide containing compound is selected from the group consisting of boric acid and alkali metal borates, and the silicon oxide containing compound is an alkali metal silicate.

45. The process of claim 44, wherein the alkali metal of the alkali metal borate and alkali metal silicate is sodium or potassium.

46. The process of claim 41, wherein the alkali metal flux is selected from the group consisting of alkali metal carbonates and alkali metal bicarbonates.

47. The process of claim 42, wherein the alkali metal flux is at least one alkali metal carbonate.

48. The process of claim 47, wherein the alkali metal is selected from the group consisting of sodium, potassium, and mixtures thereof.

49. The process of claim 40, wherein the gas generator is a carbon oxide gas generator.

50. The process of claim 49, wherein the carbon oxide gas generator is selected from the group consisting of carbonates, bicarbonates, carbohydrates, and mixtures thereof.

51. The process of claim 50, wherein the carbohydrate is selected from the group consisting of sugar and glycerin.

52. The process of claim 50, wherein the carbonate is selected from the group consisting of sodium carbonate, potassium carbonate, sodium bicarbonate, and potassium bicarbonate.

53. The process of claim 40, wherein the diatomaceous earth is selected from the group consisting of natural diatomaceous earth, calcined diatomaceous earth, and flux-calcined diatomaceous earth.

54. The process of claim 1 wherein heating step (b) is performed in the presence of a reducing agent in an amount sufficient to substantially inhibit oxidation of said at least one water soluble gas generator.

* * * * *